J. W. KAISER.
PRESSURE RELEASE VALVE.
APPLICATION FILED JULY 28, 1916.

1,355,230.

Patented Oct. 12, 1920.

Inventor.
Jacob W. Kaiser
By Thurston & Rivers
attys

UNITED STATES PATENT OFFICE.

JACOB W. KAISER, OF EAST CLEVELAND, OHIO.

PRESSURE-RELEASE VALVE.

1,355,230.  Specification of Letters Patent.  Patented Oct. 12, 1920.

Application filed July 28, 1916. Serial No. 111,779.

*To all whom it may concern:*

Be it known that I, JACOB W. KAISER, a citizen of the United States, residing at East Cleveland, in the county of Cuyahoga and State of Ohio, have invented a certain new and useful Improvement in Pressure-Release Valves, of which the following is a full, clear, and exact description.

This invention relates to a device intended for use in connection with pumping air or other fluid into a receptacle whereby the device may be filled with air or other fluid to a predetermined degree of compression.

More particularly the device of this invention is intended to be used in connection with a pump for the inflation of tires, so that the tires may be pumped to a predetermined degree of inflation.

Generally speaking, the invention may be said to comprise the elements and combinations thereof set forth in the accompanying claims.

Figure 1:
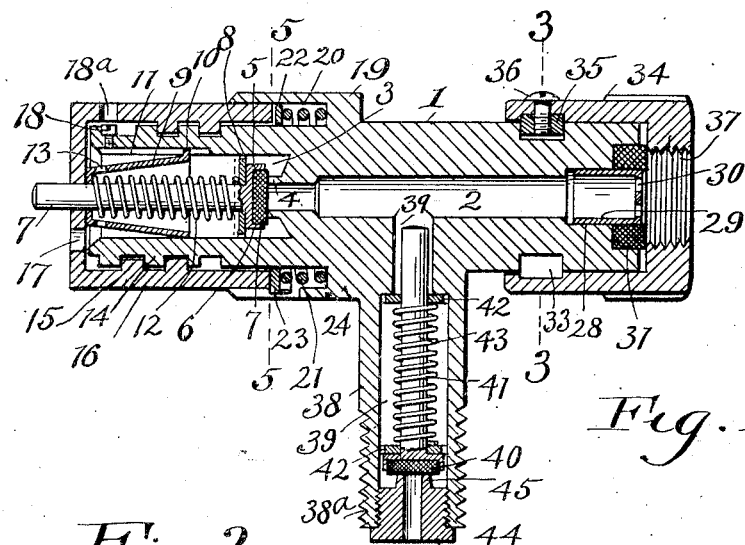
Figure 2:
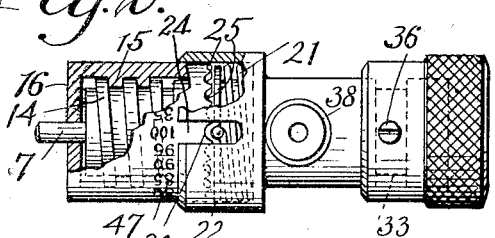
Figure 3:
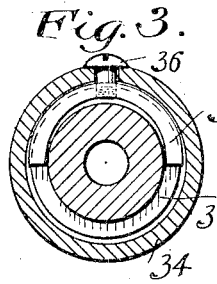
Figure 4:
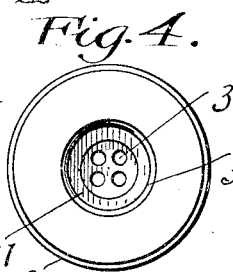
Figure 5:
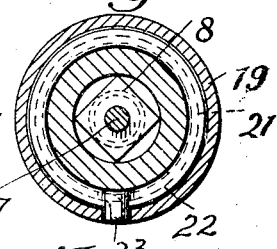
Figure 6:
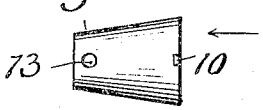
Figure 7:

Reference should be had to the accompanying drawings forming a part of this specification, in which Figure 1 is a sectional elevation of the device of my invention; Fig. 2 is a side elevation with certain parts in section; Fig. 3 is a section upon the line 3—3 of Fig. 1; Fig. 4 is an end elevation; Fig. 5 is a section upon the line 5—5 of Fig. 1; Fig. 6 is an elevation of a part of my device, and Fig. 7 is an end view of the portion shown in Fig. 6.

As before indicated, the device of this invention is intended to be used in connection with pumping air or other fluid into a container, and the device is provided with a relief valve 1 which may be set to operate at any predetermined pressure so that if pumping be continued beyond the predetermined pressure, the relief valve will become operative and permit the escape of the fluid being pumped. In this manner the device being inflated will not be damaged by pumping to a pressure beyond that desired.

In the embodiment herein described and shown in the drawings, 1 indicates the body of the valve and preferably comprises a unitary body, which is provided with a central passageway 2. This passageway is enlarged at one end thereof, as indicated at 3, and there is also provided a valve seat 4. Within the enlarged portion 3 there is a valve 5, this valve being adapted to coöperate with the valve seat 4. The valve comprises a cup shaped member 6 in which is a leather or rubber body 7 which is adapted to press against the seat 4. The body 6 has a valve stem 7ª, and surrounding the valve stem and suitably secured thereto is a guide 8. This guide is preferably rectangular, as indicated in Fig. 5, and is of such size that the points of the guide 8 will engage the side walls of the enlargement 3, thus guiding the valve as it may move toward and from its seat.

Within the enlarged chamber 3 there is a conical member 9. This member is hollow and is provided with an extension 10, which engages a slot 11 formed in the side wall of the enlargement 3, this construction being for the purpose of guiding the part 9 as it may move up and down and within the chamber 3. This hollow member acts as a means to prevent the turning of the spring 12 when the cap 16 is turned. The member 9 at its top is closed, except that it is provided with an opening through which extends the stem 7. There is a spring 12 which, at one end, bears against the guide member 8, and at its opposite end, bears upon the interior top surface of the member 9. The member 9 is also provided with openings such as indicated at 13, which will permit the escape of air, as later described.

The exterior of the body portion 1 adjacent the chamber portion 3 is provided with threads, as indicated at 14. These threads coöperate with complementary threads 15, which are formed upon the inner surface of a cap 16. The cap, at its upper end, is provided with an opening, through which extends the valve stem 7. The cap has also one or more openings in the top thereof, which are indicated at 17, these openings permitting the escape of air, as later described.

The body 1 adjacent the outer end of the chamber portion 3 is provided with a stop 18. This stop is so positioned as to engage with one of the threads 15 when the cap is turned or secured outwardly from the body 1, the stop serving to limit the outward position to which the cap 16 may be moved. The inner limit to which the cap 16 may be moved will be when the top of the cap engages with the end of the body 1. The stop 18 is as shown, a threaded member which is inserted in a suitable thread opening formed in the body 1 and may be inserted through the opening 18ª in the body 1 when the cap is screwed to its most inward position.

The body 1 is provided with an extension 19, which is counterbored, as indicated at 20. This counterbored portion receives a spring 21. The spring bears against a washer-like member 22, which has an extension 23 that moves within a slot 24 formed in the wall of the extension 19.

The inner end of the cap 16 bears against the washer 22. This inner end of the cap is provided with a series of serrations indicated at 25, these serrations engaging with a shoulder 26, which is formed upon the ring 22, the shoulder being placed upon the ring adjacent the portion which is near the slot 24. The ring 22 being spring pressed causes the shoulder 26 to always engage with one of the serrations. This construction serves as a retention or locking device, which holds the cap 16 against movement in such position as it has been adjusted.

At the end of the device opposite to that which has just been described, the passageway 2 is slightly enlarged, as indicated at 28. This enlargement 28 receives a thimble 29, which is provided with openings 30. The body 1 surrounding the thimble 29 is enlarged and receives a packing washer 31.

Adjacent an end thereof, the body 1 is provided with an annular channel 33, and extending over this channel is a cap 34. This cap is provided with an annular recess portion at the end thereof, and seated within the groove 33 there is a member 35 which is adapted to be secured to the cap by means of a screw or other device, such as indicated at 36. This member 35 may occupy all or any portion of the groove 33 and extends into the grooved portion 33 and the cap 34. This construction permits the cap 34 to swivel upon the body 1.

The outer end of the cap is provided with a threaded opening 37, this being adapted to receive the end of tire nipple or any threaded device which is to be connected with the thing to be inflated.

The relation of the packing 31 and the opening 37 is such that the opening overlies the packing 31. Therefore, as will be seen the packing 31 is removed from the openings 30 so that when the nipple of the tire is received into the opening 37, the end of the nipple will be received by the washer 31, which washer will be compressed more or less and form an air tight packing. However, if the washer 31 slightly spreads, it will not cover the openings 30.

The end of the thimble 29 has, at the center thereof, a portion which is adapted to receive the end of the tire valve, compressing the same to open the valve in the tire nipple.

Extending sidewardly from the body portion 1 is a tubular extension 38. This tubular extension communicates with the passageway 2 by means of a passageway 39. Within the tubular portion 38 is a valve 40, which has a valve stem 41. Around this valve stem there are guides 42, which extend over the stem 41 and engage with the walls of the tubular extension 38. These guides position the valve stem 41 so that when the valve 41 moves, it moves in a straight line. Between the guides 42 there is a spring 43, this spring normally urging the valve 40 to its seat.

In the end of the tubular portion 38 there is a threaded plug 44. This plug has a valve seat 45 thereon, which coöperates with the valve 40.

This extension 38 is, upon the exterior thereof, provided with screw threads such as indicated at 38ª, these threads being adapted to receive a coupling, which will connect with the pump or other source of air or fluid under pressure.

The flanged portion of the cap 16 is provided with suitable markings, which, when calibrated, will indicate pressures. These markings are indicated at 47 in Fig. 2, the particular pressure to which it is desired to set the device being indicated by moving the proper indication 47 in line with the slot 24.

The operation of the device is as follows:—

The extension 38 is secured to the pump or other source of fluid under pressure. To the member 34 is secured the tire nipple of the tire to be inflated.

The cap 16 is then turned until the indication number of the pressure desired is in line with the slot 24. The air or fluid under pressure will pass through the hollow extension 38, past the check valve 40, into the passage 2, and thence to the tire. The valve 6 will remain seated until the back pressure from the tire is sufficient to unseat the valve 6.

As before stated, the device will be calibrated so that the valve 6 will only become unseated by the back pressure, when the back pressure being exerted upon the valve 6 is the pressure in pounds per square inch, which is indicated by the indication 47, which is in line with the slot 24.

When the valve is unseated, the air passes through the channel portion 3, out through the drilled openings 13 in the member 9, and through the openings 17 in the cap 16.

The provision of the member 9 insures the free passage of air even though the cap member 16 be screwed to its innermost position, so that the end of the cap is in engagement with the end of the body 1.

Having thus described my invention, I claim:—

1. In a device of the character described a combination with a body portion having a centrally arranged opening therein, a valve coöperating with the end of said opening, a cap threaded over the end of the said body portion, the stem of the valve extending through the end of the cap, a hollow member having one end thereof bearing against the cap and extending around the valve stem, means for preventing the hollow member from turning, a spring bearing against the inner side of the hollow member and the valve, said hollow member being provided with openings adjacent its outer end, and said cap being provided with openings adjacent its outer end, and a second passageway formed in the body communicating with the first mentioned passageway, a check valve associated with said second mentioned passageway.

2. In a device of the character described a combination with a body portion having a centrally arranged passageway therethrough, an enlarged recess portion at one end of the body, a valve in said recess portion and forming a closure for the end of the said passageway in the body, a hollow member within said recess portion, a spring extending within the hollow member and bearing against the valve, coöperating means between the said hollow member and an interior wall of the recess portion whereby the hollow member is prevented from turning but may slide within the recess portion, a threaded cap engaging with the end of the body adjacent the recess portion, said hollow member being provided with openings adjacent its outer end, and the cap being provided with openings adjacent its outer end, a second passageway formed in the body portion, and a check valve associated with said passageway.

3. In a device of the character described a body portion having a centrally arranged passageway therethrough, said body being provided with a recess portion adjacent one end thereof, a valve within said recess portion and coöperating with an end of the passageway, a conical shaped hollow member within said recess portion and surrounding the valve stem, a spring extending within the said hollow member and bearing against the valve, coöperating means upon the said hollow member and an interior wall of the recess portion for preventing the turning of the hollow member, but permitting it to slide within the recess portion adjacent the recess end thereof, said hollow member being provided with openings adjacent its outer end, and the cap member also being provided with openings adjacent its outer end, a second passageway in the body communicating with the first passageway, and a check valve associated with said passageway.

4. In a device of the character described a body portion having a centrally arranged passageway extending therethrough, a valve coöperating with said passageway, a cap threaded upon the said body adjacent the said valve, a spring extending between the inside of the cap and the valve, the body being provided with an extension having an outer wall and providing a recess within the outer wall into which the edge of the cap extends, a spring within said recess part, a detent device lying between the edge of the cap and the spring, the lower end of cap being provided with indentations which coöperate with the said detent device, and coöperating means between the detent device and the said wall for preventing the turning of the detent device.

5. In a device of the character described a body portion having a centrally arranged passageway therethrough, a valve coöperating with the end of the passageway, a cap threaded upon the body portion, a spring between the inside of the cap and the valve, the body being provided with an extension having an outer wall with a slot formed therein, there being a recess within the outer wall into which the edge of the cap extends, a spring within said recess part, a detent device lying between the spring and the edge of the cap, the edge of the cap being provided with indentations which coöperate with the detent device, and a projection carried by the detent device which coöperates with the slot in the said outer wall.

In testimony whereof, I hereunto affix my signature.

JACOB W. KAISER.